United States Patent [19]

O'Lenick, Jr.

[11] Patent Number: 4,973,643

[45] Date of Patent: Nov. 27, 1990

[54] ETHER AMINE FUCTIONAL SILICONE POLYMERS

[75] Inventor: Anthony J. O'Lenick, Jr., 743 Ridgeview Dr., LilBurn, Ga. 30247

[73] Assignee: Siltech Inc., Norcross, Ga.

[21] Appl. No.: 448,308

[22] Filed: Dec. 11, 1989

[51] Int. Cl.$^5$ .............................................. C08G 77/06
[52] U.S. Cl. ........................................ 528/15; 528/10; 528/25; 528/28; 528/29; 528/38; 525/479; 556/425
[58] Field of Search ...................... 528/25, 29, 10, 15, 528/28, 38; 525/479; 556/425

[56] References Cited

U.S. PATENT DOCUMENTS 2,947,771  8/1960  Bailey .................................. 556/425
4,476,188  10/1984 Blizzard et al. ....................... 528/31

FOREIGN PATENT DOCUMENTS 606697  10/1960  Canada ................................ 556/425

*Primary Examiner*—Melvyn I. Marquis
*Assistant Examiner*—Karen A. Hellender

[57] ABSTRACT

The invention discloses novel organofunctional silicone polymers which have an ether amino pendant functionality present within the polymer. Compounds of the invention by virtue of their ether amino group, deposit on the surface of substrates, either alone or as complexes with cations. Thereby altering the substrate's surface physical properties. The desirable durable properties which can be given to substrates include; softness, lubrication, soil release, and hydrophoblicity. The compounds of the present invention are prepared by introduction of an amino group onto the silicone pendant group. Aminolysis and cyanoethylation of a hydroxy containing silicone polymer, or hydroxy containing vinyl intermediate which is subsequently introduced into the polymer backbone by hydrosilation are the preferred methods for peparing the compounds of the present invention.

4 Claims, No Drawings

ETHER AMINE FUCTIONAL SILICONE POLYMERS

BACKGROUND OF THE INVENTION (1) Field of Invention

The present invention relates to a series of novel ether amino functional silicone polymer compounds which are substantive to various substrate surfaces. The compounds when applied provide softness, antistatic properties, lubrication, soil release, and hydrophobicity. The aminolysis or cyanoethylation of hydroxyl containing silicone polymers, results in novel compounds. When an alkoxylated hydroxy compound is reacted by aminolysis or cyanoethylation, a series of products ranging in water/oil solubility can be prepared. This ability to vary molecules allows outstanding flexibility in performance characteristics.

(2) Object of the Invention

The present invention discloses a series of ether amine functional silicone polymers. These compounds are substantive to the surface of fibrous, plastic or cellulosic material. This substantivity makes these compounds useful as softeners and lubricants.

It is another objective of the current invention to provide ether amino silicone polymers which can be used in textile and laundry applications to render antistatic, softness and lubrication to the garments treated. The superior antistatic properties are an important benefit, since this is a major aspect of consumer perception of softness in consumer and industrial laundry applications. Lubrication has been a property which is purported to effect garment life. Application of the compounds of the invention can be from solvent, aqueous dispersion or solution, or applied neat in these processes.

Still another object of the present invention is to provide a series of products which have differing solubilities in water and organic solvents. This is achieved by selection of the hydroxyl silicone raw material. Hydroxy containing silicone compounds, suitable as raw materials for this invention, are commercially available and sold under the SILWET trade name. The silicone polymer can contain varying amounts of ethylene oxide, propylene oxide, butylene oxide or mixtures thereof. Alkoxylated silicone polymers of this type exhibit an inverse cloud point. The inverse cloud point phenomenon is well known to those skilled in the art of nonionic surface active agents. It is defined as a temperature above which the polymer has minimal solubility in water. The point at which the polymer has minimal water solubility is the same point at which it has maximum substantivity to a substrate.

DESCRIPTION OF THE PRIOR ART

Silicone compounds have been known to be active at the surface of plastic, cellulosic and synthetic fibers as well as paper. They are good nondurable lubricants and are very stable to oxidation, however, their high cost and lack of efficiency at low concentrations as well as low durability have made their acceptance in commercial products quite low. In all instances, commercially available quats are the active ingredient in traditional laundry care markets, with little or no silicone added.

The low efficiency and low durability of polydimethylsiloxane is due to the fact that it is very water insoluble and deposits on the surface to obtain a minimum free energy in the solution. Simply, the silicone oil delivery to the surface is by hydrophobic binding, not chemical bonding. At the surface, the polydimethylsiloxane is a very effective fiber lubricant, however, there are two drawbacks, first; the polydimethylsiloxane is not chemically bonded so the effect is very transient and disappears with one washing, and second; since there is no reaction of the polydimethylsiloxane to the surface an equilibrium between fiber absorbed polydimethylsiloxane and polydimethylsiloxane in the dispersion results in very inefficient percentages of silicone deposited. A large amount of the expensive silicone goes down the drain with the waste water.

Many attempts have been made to overcome these problems and get a truly substantive product, which deposits efficiently. One approach has been to use hydrosilation technology to make alkoxylated silicone polymers, used as raw materials in this invention. These materials do not have the substantivity desired to make them suitable for use as antistats, softeners and or soil release agents. Hydrosilation technology is known to those skilled in the art and is outlined in U.S. Pat. No. 4,083,856. These materials, prepared by the hydrosilation of a vinyl alkoxylated alcohol and a silanic hydrogen containing polymer, by virtue of their alkoxylation, exhibit a high cloud point classically seen in nonionics, which is a point were at some elevated temperature, the silicone polymer comes out of solution and becomes more substantive to the hydrophobic substrate. This approach allows for better efficiencies but does little if anything for long term substantivity.

U.S. Pat. No. 3,511,699 to Sterman issued May 12, 1970 teaches that epoxy compounds placed in the silicone backbone by hydrosilation can be cured onto certain fibers to give improved substantivity. The hydroxyl groups on the cellulosic and the epoxy group in the silicone polymer react, resulting in a ether linkage. While this technique is a definite improvement over prior art compounds, their cost, efficiency and durability made their acceptance and commercial use minimal.

THE INVENTION

Summary of the Invention

The present invention relates to novel silicone polymer compounds which have an amino pendant functional group present. The polymers by virtue of the pendent group deposit on substrate surfaces and form effective surface modifying finishes. The compounds of the present invention are substantive to cellulosic and synthetic fibers as well as metal surfaces and plastic polymers.

The compounds of this invention having a pendant amino group are represented by the following formula:

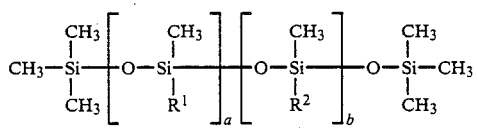

a is an integer from 1 to 200;
b is an integer from 1 to 200;
$R^1$ is selected from $-(CH_2)_nCH_3$ and phenyl;
n is an integer from 0 to 10;

$R^2$ is —$(CH_2)_3$—$(OCH_2CH_2)x$—$(OCH_2CH(CH_3))y$—$(OCH_2CH_2)z$—$R^3$; with the proviso that $x+y+z$ is greater than zero;

x, y and z are integers and are independently selected from 0 to 20.

The products of the present invention are prepared by reaction of a hydroxyl containing silicone polymer with a suitable aminating reagent. One method of preparing the hydroxy containing silicone polymer is to react a silanic hydrogen polymer with allyl alcohol or an allyl alcohol alkoxylate. Procedures this reaction are well known to those skilled in the art, and are described in U.S. Pat. No. 4,083,856.

EXAMPLES

Vinyl Intermediate Compounds

Compounds of this class are prepared by alkoxylation of allyl alcohol using methods well known to those skilled in the art. The following are some of the many compounds which can be used to make the products of this invention.

| $CH_2$=CH—$CH_2$—O—$(CH_2$—$CH_2$—O$)x$- $(CH_2$—CH($CH_3$)—O$)y$-$(CH_2$—$CH_2$—O$)z$-H | | | | |
|---|---|---|---|---|
| Designation | x | y | z | Molecular Weight |
| A | 3 | 0 | 0 | 189 |
| B | 9 | 27 | 3 | 2,178 |
| C | 11 | 3 | 0 | 718 |
| D | 0 | 0 | 0 | 57 |
| E | 20 | 20 | 20 | 2,940 |
| F | 20 | 0 | 0 | 880 |
| G | 10 | 10 | 10 | 1,470 |

Preparation of Intermediates

Silicone intermediates of the type used to make the compounds of this invention are well known to those skilled in the art. International Publication (*Silicone Alkylene Oxide Copolymers As Foam Control Agents*) WO 86/0541 by Paul Austin (Sept. 25, 1986) p.16 (examples 1 to 6) teaches how to make the following intermediates, and is incorporated herein by reference.

Hydrosilation of Intermediates

Silanic Hydrogen Containing Compounds

```
        CH3      CH3     CH3     CH3
         |        |       |       |
  CH3—Si—O—Si—O—Si—O—Si—CH3
         |        |       |       |
        CH3      CH3      H      CH3

M        D       D'      M
```

| | | Group Designations | | |
|---|---|---|---|---|
| Example | Austin Example | Group Designation | Average Molecular Weight | Equivalent Molecular Weight |
| 1 | 1 | $MD_{20} D'_{3.2} M$ | 1,850 | 551 |
| 2 | 4 | $MD_{160} D'_5 M$ | 24,158 | 4,831 |
| 3 | 6 | $MD_{20} D'_{10} M$ | 2,258 | 225 |

Hydrosilation Compounds

The hydrosilation reaction used to make the compounds of this invention are well known to those skilled in the art. Reference; International Publication (*Silicone Alkylene Oxide Copolymers As Foam Control Agents*) WO 86/0541 by Paul Austin (Sept. 25, 1986) p.19.

EXAMPLE 4

To a 22 liter three necked round bottom flask fitted with a mechanical agitator, thermometer with a Thermo-watch temperature regulator, nitrogen sparge tube, vented reflux condenser, and heating mantle is added 189.0 grams of Vinyl Intermediate Example # A. Next add 225 grams of Silanic Hydrogen Containing Compound Example # 3 and 3,000 grams of toulene. Heat to 115 C. to azeotropically remove any water and 200 ml of toluene. The temperature is reduced to 85 C. and 3.5 ml of 3% as $H_2PtCl_6$ in ethanol is added. Light is then excluded from the flask by covering it with a black cloth. An exotherm is noted to about 95 C., while the contents are stirred for about 2 hours. During this time the silanic hydrogen concentration drops to nil. Cool to 65 C. and slowly add 60 g of sodium bicarbonate, allow to mix overnight and filter through a 4 micron pad. Distill off any toluene at 100 C. and 1 torr.

EXAMPLES 5–10

The above procedure is repeated, only this time replacing both the silanic hydrogen compound # 3 with the specified number of grams of the specified silanic hydrogen compound and the vinyl intermediate example A with the specified number of grams of the specified vinyl intermediate.

| | Vinyl Intermediate | | Silanic Hydrogen Compound | |
|---|---|---|---|---|
| Example | Example | Grams | Example | Grams |
| 4 | A | 189.0 | 1 | 551.0 |
| 5 | B | 2,178.0 | 2 | 4,831.0 |
| 6 | C | 718.0 | 3 | 225.0 |
| 7 | D | 57.0 | 1 | 551.0 |
| 8 | E | 2,940.0 | 2 | 4,831.0 |
| 9 | F | 880.0 | 3 | 225.0 |
| 10 | G | 1,470.0 | 1 | 551.0 |

Cyanoethylation

The technology used to make ether amine compounds is disclosed in U.S. Pat. No. 3,404,165 prepared by a process. Hydroxyl containing silicone compounds, previously described, are reacted with acrylonitrile or methacrylonitrile.

The preparation of the novel silicone ether amines of this invention from the hydroxy silicone compounds can be illustrated by the following reaction in which R is the hydroxy silicone compound conforming to the following structure;

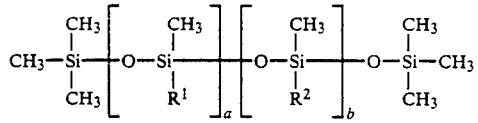

a is an integer from 1 to 200;
b is an integer from 1 to 200;
$R^1$ is selected from —$(CH_2)_n CH_3$ and phenyl;
n is an integer form 0 to 10;
$R^2$ is —$(CH_2)_3$—$(OCH_2CH_2)x$—$(OCH_2CH(CH_3))y$—$(OCH_2CH_2)z$—$R^3$;
x, y and z are integers and are independently selected from 0 to 20;
$R^3$ is —OH

Cyanoethylation Reaction Sequence

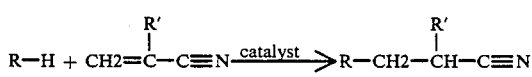

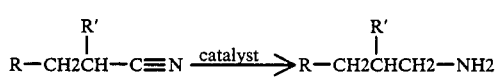

Additional Acrylonitrile Addition

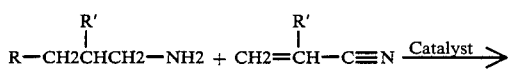

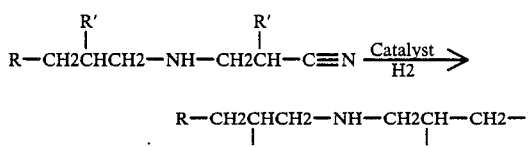

In preparing the silicone ether nitriles according to Reaction 1 above, the hydroxy silicone compound and acrylonitrile (or methacrylonitrile) are reacted in stiochiometric amounts (preferably with 2 to 5 percent excess of the acrylonitrile) in the presence of a soluble alkaline catalyst such as a metal alkoxylate, e.g., sodium methoxide, potassium methoxide, sodium ethoxide, potassium ethoxide, and the like, or oxides and hydroxides of those metals soluble in hydroxy silicones such as sodium methoxide, potassium methoxide, sodium hydroxide and potassium hydroxide. The catalyst may be introduced into the reaction mixture per se, or they may be formed in the reaction mixture in situ, the amount of catalyst being present in the amount of 0.005 to one percent of the total weight of the reactants. Generally, this reaction will be carried out at a temperature in the range of 30-100 C., using atmospheric or autogenous pressure. The resulting reaction mixture, containing the silicone ether nitrile, can be treated to recover this latter product for subsequent hydrogenation. In a preferred case the product can be directly hydrogenated. This hydrogenation reaction illustrated by Reaction 2 above can be carried out for example, at a temperature in the range of 70-175 C. and pressures in the range from atmospheric pressure up to as much as 250 atmospheres of hydrogen (and 1 to 25% ammonia by weight of the reaction mixture) using such hydrogenation catalysts as nickel, copper, cobalt, palladium metal or oxide, platinum metal or oxide and chromium oxide, though the preferred catalyst is Raney nickel. Following the completion of the hydrogenation reaction, the low molecular weight volatile materials such as ammonia are removed using a water aspirator, to recover the silicone ether amine product. This latter product is then reacted with acylonitrile (or methacrylonitrile), preferably with 2 to 5 percent stiochimetric excess of the latter, as shown in Reaction 3. This latter reaction is preferably carried out in the presence of a catalytic amount of an acid catalyst, e.g., 0.005 to one percent acetic acid, based on the total weight of reactants, at temperature and pressure conditions like that of Reaction 1. The hydrogenation of the resulting silicone ether amine nitrile, Reaction 4, is then carried out in the manner of Reaction 2 and the resulting novel silicone ether amine is used without additional purification.

The following examples further illustrate the objects and advantages of this invention, though it should be understood that the various reactants and amounts thereof, reaction conditions, and other details are merely illustrative and should not be construed to unduly limit this invention. The compounds conform to the following structure;

GENERAL PROCEDURE

The specified amount of the hydroxy silicone compound (Examples 4–10) is added to an autoclave with 0.3% of metallic sodium. The specified amount of acrylonitrile is charged to the autoclave over a 30 min. period. It is noteworthy that the reaction sequence of the acrylonitrile reaction followed by hydrogenation is repeated until the desired number of moles of acrylonitrile have been added. The exothermic reaction raises the temperature of the mixture to 65-70 C., and after 1 hr. of reaction the mixture cooled to 35 C. and was neutralized with glacial acetic acid (to neutralize sodium derivatives). The resulting reaction mixture is then hydrogenated in the presence of 2%, of Raney nickel for about 7 hrs. at a hydrogen pressure of 500 p.s.i.g. and at about 300 F. The resulting reaction product can then be repeated with additional acrylonitrile over about a 4 hr. period, producing a higher acrylonitrile adduct. The nitrile is then hydrogenated after being purged with hydrogen and pressured to 80 p.s.i.g. with ammonia. The reaction mixture is then heated to about 300 F. under 550 p.s.i.g. hydrogen pressure over about a period of 2 hrs.

One mole added Acrylonitrile

| Example | Hydroxy Silicone Example | Hydroxy Silicone Grams | Acrylonitrile Grams |
|---|---|---|---|
| 11 | 4 | 740.0 | 56.0 |
| 12 | 5 | 7009.0 | 56.0 |
| 13 | 6 | 943.0 | 56.0 |
| 14 | 7 | 608.0 | 56.0 |
| 15 | 8 | 7771.0 | 56.0 |
| 16 | 9 | 1105.0 | 56.0 |
| 17 | 10 | 2021.0 | 56.0 |

Two Mole Acrylonitrile

| Example | Hydroxy Silicone Example | Hydroxy Silicone Grams | Acrylonitrile Grams |
|---|---|---|---|
| 18 | 11 | 798.0 | 56.0 |
| 19 | 12 | 7067.0 | 56.0 |
| 20 | 13 | 1001.0 | 56.0 |
| 21 | 14 | 666.0 | 56.0 |
| 22 | 15 | 7829.0 | 56.0 |
| 23 | 16 | 1163.0 | 56.0 |
| 24 | 17 | 2079.0 | 56.0 |

Aminolysis Reaction Sequence

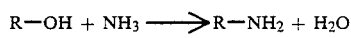

The reaction of the hydroxyl group on the silicone polymer with ammonia is accomplished using processes and procedures known to those skilled in the art, U.S. Pat. No. 2,953,601 issued Sept. 1960 to Whitaker is typical of processes used.

At least two moles of ammonia per mole of hydroxy containing silicone is added at a temperature of 150 to 225 C. and a pressure of from atmospheric to about 3,000 psi. Water is continuously stripped off. The conversion was substantially complete.

EXAMPLE

Into a suitable reaction vessel is placed the specified number of grams of hydroxy silicone examples 4–10, and 1.0% on a total weight basis of raney nickel. The specified amount of ammonia is slowly bubbled through the reaction liquid at a temperature of 180 to 200 C. over a period of 4 to 6 hours. The water formed during the reaction is condensed and removed from the reaction zone, while the ammonia is replenished. Once the hydroxyl value has become vanishingly small and the amine value approaches theoretical the reaction is stopped and the residual ammonia striped off.

| | Hydroxy Silicone | | Ammonia |
|---------|---------|--------|---------|
| Example | Example | Grams  | Grams   |
| 25      | 4       | 740.0  | 30.0    |
| 26      | 5       | 7009.0 | 30.0    |
| 27      | 6       | 943.0  | 30.0    |
| 28      | 7       | 608.0  | 30.0    |
| 29      | 8       | 7771.0 | 30.0    |
| 30      | 9       | 1105.0 | 30.0    |
| 31      | 10      | 2021.0 | 30.0    |

Applications Evaluation

Softening

Compounds of this invention were compared to standard compounds commercially available for softness at 0.1% concentration. In order to evaluate the durability of the softener, the swatches which were cotton, polyester blends were washed in Ajax detergent with no softeners, 5 times as per label instructions and dried in a home drier. Softness was then reevaluated. The softness is rated on a 1–5 basis (5 being the most harsh).

Standard Compounds

| | | Softness Rating | |
|---|---|---|---|
| Compound | Type of Compound | 0 Wash | 5 Wash |
| Alkaquat DAET-90 | Amido Quat | 3 | 5 |
| Alkaquat T | Imidazoline Quat | 3 | 5 |
| Distearyl-dimethyl-ammonimum chloride | Diquat | 2 | 4 |

| | | Softness Rating | |
|---|---|---|---|
| Example | Type of Product | 0 Wash | 5 Wash |
| 12 | Compounds of this invention | 3 | 3 |
| 16 | Compounds of this invention | 3 | 3 |
| 21 | Compounds of this invention | 2 | 3 |
| 27 | Compounds of this invention | 2 | 4 |
| 30 | Compounds of this invention | 2 | 3 |

What is claimed:

1. A silicone compound which conforms to the following structure:

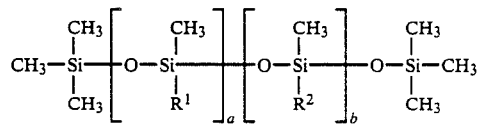

a is an integer from 1 to 200;
b is an integer from 1 to 200;
$R^1$ is selected from $-(CH_2)_nCH_3$ or phenyl;
n is an integer ranging from 0 to 10;
$R^2$ is $-(CH_2)_3-(OCH_2CH_2)x-(OCH_2CH(CH_3))y-(OCH_2CH_2)z-R^3$;
x, y and z are integers and are independently integers ranging from 0 to 20;
$R^3$ is $-O(CH_2)_3-N(H)-[(CH_2)_3-N(H)]_m-H$;
m is an integer from 0 to 10.

2. A compound of claim 1 wherein $R^1$ is $CH_3$.
3. A compound of claim 1 wherein $R^1$ is phenyl.
4. A compound of claim 1 wherein x is 3, y is 2 and z is 3.

* * * * *